(12) United States Patent
Roche et al.

(10) Patent No.: US 8,021,634 B2
(45) Date of Patent: Sep. 20, 2011

(54) SULFATE PROCESS

(75) Inventors: Eric Girvan Roche, Booragul (AU); Philip Ernest Grazier, Kilaben Bay (AU); Alan David Stuart, New Lambton (AU)

(73) Assignee: BHP Billiton Innovation Pty. Ltd. (AU)

( * ) Notice: Subject to any disclaimer, the term of this patent is extended or adjusted under 35 U.S.C. 154(b) by 15 days.

(21) Appl. No.: 12/440,099

(22) PCT Filed: Sep. 6, 2007

(86) PCT No.: PCT/AU2007/001320
§ 371 (c)(1),
(2), (4) Date: Jul. 29, 2009

(87) PCT Pub. No.: WO2008/028244
PCT Pub. Date: Mar. 13, 2008

(65) Prior Publication Data
US 2009/0311153 A1   Dec. 17, 2009

(30) Foreign Application Priority Data
Sep. 6, 2006 (AU) .................. 2006904881

(51) Int. Cl.
*C01G 23/047* (2006.01)

(52) U.S. Cl. ................................ 423/82; 423/610

(58) Field of Classification Search ............ 423/82, 423/610
See application file for complete search history.

(56) References Cited

U.S. PATENT DOCUMENTS

| | | | | | |
|---|---|---|---|---|---|
| 1,504,672 | A | * | 8/1924 | Blumenfeld | 423/616 |
| 3,071,439 | A | * | 1/1963 | Solomka | 423/85 |
| 3,615,204 | A | * | 10/1971 | Libera et al. | 423/85 |
| 4,288,415 | A | | 9/1981 | Rahm et al. | |
| 4,288,417 | A | | 9/1981 | Rahm et al. | |
| 2005/0180903 | A1 | * | 8/2005 | Roche et al. | 423/86 |

FOREIGN PATENT DOCUMENTS

| | | |
|---|---|---|
| EP | 0 869 194 | 2/2004 |
| WO | 2005/038060 * | 4/2005 |
| WO | WO2005/090619 | 9/2005 |
| WO | WO2006/105611 | 10/2006 |

* cited by examiner

*Primary Examiner* — Steven Bos
(74) *Attorney, Agent, or Firm* — Brinks Hofer Gilson & Lione; G. Peter Nichols (57) ABSTRACT

A sulfate process for producing titania from a titaniferous material (such as an iron-containing titaniferous material such as ilmenite) is disclosed. The process includes digestion and/or leach steps that form a process solution that includes an acidic solution of titanyl sulfate (TiOSO4) and iron sulfate (FeSO4) from the solid titaniferous material. The process also includes hydrolysis and other steps that form titania from the titanyl sulfate in the process solution. The process is characterised by a ferric ion treatment step of treating the process solution and lowering the concentration of ferric ions from the process solution.

13 Claims, 5 Drawing Sheets

FIG. 1

Figure 2: A series of graphs obtained from each $SO_2$-Fe(III) reduction experimental run in Example 1.

Figure 3: Overlayed graphs of the decrease in Fe(III) concentration with time the solution/ catalyst contact time. Two distinct sections of this graph can be observed showing a marked dependence on Fe(II) concentration.

Figure 4 - Iron Reduction Experimental Set Up for Example 2

Figure 5 - Effect of Acid Concentration on Reaction Rate

Figure 6 - A plot of $Ti^{3+}$ concentration vs O

SULFATE PROCESS

This application claims priority to PCT Application Serial No. PCT/AU2007/001320 filed Sep. 6, 2007 published in English on Mar. 13, 2008 as PCT WO 2008/028244 and also to Australian Application No. 2006/904881 filed Sep. 6, 2006, the entire contents of each are incorporated herein by reference.

The present invention relates to a process for producing titania from a titaniferous material.

The term "titaniferous" material is understood herein to mean any titanium-containing material, including by way of example ores, ore concentrates, and titaniferous slags.

The present invention relates particularly to the sulfate process for producing titania from a titaniferous material.

The present invention relates to the conventional sulfate process and to a sulfate process developed by the applicant.

The conventional sulfate process for producing titania from a titaniferous material (such as an iron-containing titaniferous material such as ilmenite—$FeTiO_3$ or $FeO.TiO_2$) of the type which includes the steps of:

(a) digesting solid titaniferous material with concentrated sulphuric acid (b) dissolving the digested titaniferous material produced in step (b) and forming a process solution that includes an acidic solution of titanyl sulfate ($TiOSO_4$) and iron sulfate ($FeSO_4$);

(c) treating the process solution with scrap iron to reduce ferric ions in solution to ferrous ions and thereby lower the concentration of ferric ions in the process solution, (d) hydrolysing the titanyl sulfate in the process solution and forming a solid phase containing hydrated titanium oxides and a liquid phase;

(e) separating the solid phase containing hydrated titanium oxides and the liquid phase; and (f) calcining the solid phase from step (g) and forming titania.

The conventional sulfate process may include a step of removing iron sulfate from the process solution before hydrolysis step (d).

International application PCT/AU2004/001421 in the name of the applicant describes an invention of the sulfate process made by the applicant. The disclosure in the International application is incorporated herein by cross-reference.

In general terms, International application PCT/AU2004/001421 describes and claims a sulfate process for producing titania from a titaniferous material (such as an iron-containing titaniferous material such as ilmenite) of the type which includes the steps of:

(a) leaching solid titaniferous material with a leach solution containing sulfuric acid and forming a process solution that includes an acidic solution of titanyl sulfate ($TiOSO_4$) and iron sulfate ($FeSO_4$);

(b) separating the process solution and a residual solid phase from the leach step (a);

(c) precipitating titanyl sulfate from the process solution from step (b);

(d) separating the precipitated titanyl sulfate from the process solution;

(e) treating the precipitated titanyl sulfate and producing a solution containing titanyl sulfate;

(f) hydrolysing the titanyl sulfate in the solution and forming a solid phase containing hydrated titanium oxides and a liquid phase;

(g) separating the solid phase containing hydrated titanium oxides and the liquid phase; and (h) calcining the solid phase from step (e) and forming titania.

In addition, the sulfate process described and claimed in International application PCT/AU2004/001421 includes a step (i) of removing iron sulfate from the process solution from step (b) and/or the depleted process solution from step (d).

The term "hydrated titanium oxides" is understood herein to include, by way of example, compounds that have the formula $TiO_2.2H_2O$ and $TiO_2.H_2O$.

In addition, the term "hydrated titanium oxides" is understood herein to include compounds that are described in technical literature as titanium hydroxide ($Ti(OH)_4$).

Concentrations of metals mentioned hereinafter are understood herein as being determined by ICP (all metals) or by titration (in the cases of Ti and Fe—ferrous and ferric).

The applicant has carried out further research work on the sulfate process described and claimed in International application PCT/AU2004/001421 since the priority date of 17 Oct. 2003 of the International application and has identified a number of features that are not disclosed in the International application that are important, separately and in combination, in order to operate the process effectively.

International applications PCT/AU2006/000468, PCT/AU2006/000469, PCT/AU2006/000470, and PCT/AU2006/000471 in the name of the applicant describe and claim inventions that relate to a number of these features. The disclosures in the International applications are incorporated herein by cross-reference.

The present invention is an invention that relates to another of these features.

The present invention is based on a realisation that it is very advantageous to treat the process solution from the leaching step (a) to lower the concentration of, and preferably to remove altogether, ferric ions from the process solution upstream of the titanyl sulfate precipitation step (c).

Prior to making the above realisation, the applicant had assumed that ferric ions in the process solution would either not precipitate with titanyl sulfate in the titanyl sulfate precipitation step (c) or, if the ions did precipitate, the precipitate would be in a soluble form and would wash out readily and would not remain with the precipitated titanyl sulfate. The applicant found in the research work that, in fact, ferric ions precipitate into a form that does not readily dissolve and tends to be carried forward with titanyl sulfate to subsequent steps of the process and has an adverse affect on these process steps and ultimate product quality.

The applicant has also realised that lowering the ferric ion concentration in the process solution from the ilmenite dissolution step (b) in the conventional sulfate process by the use of $SO_2$ gas as a partial or total replacement for scrap iron has considerable benefits for the process.

Accordingly, in broad terms, the present invention provides a sulfate process for producing titania from a titaniferous material (such as an iron-containing titaniferous material such as ilmenite) that includes digestion and/or leach steps that form a process solution that includes an acidic solution of titanyl sulfate ($TiOSO_4$) and iron sulfate ($FeSO_4$) from the solid titaniferous material and hydrolysis and other steps that form titania from the titanyl sulfate in the process solution, and is characterised by a ferric ion treatment step of treating the process solution and lowering the concentration of ferric ions from the process solution.

In the context of the conventional sulfate process, as described above, preferably the ferric ion treatment step is carried out before the hydrolysis step of the process.

In the context of the sulfate process of the applicant, in broad terms, the process includes the steps of:

(a) leaching solid titaniferous material with a leach solution containing sulfuric acid and forming the process solution that includes the acidic solution of titanyl sulfate ($TiOSO_4$) and iron sulfate ($FeSO_4$);

(b) separating the process solution and a residual solid phase from the leach step (a);

(c) precipitating titanyl sulfate from the process solution from step (b);

(d) separating the precipitated titanyl sulfate from the process solution;

(e) treating the precipitated titanyl sulfate and producing a solution containing titanyl sulfate;

(f) hydrolysing the titanyl sulfate in the solution and forming a solid phase containing hydrated titanium oxides and a liquid phase;

(g) separating the solid phase containing hydrated titanium oxides and the liquid phase; and (h) calcining the solid phase from step (g) and forming titania, and wherein the ferric ion treatment step lowers the concentration of ferric ions from the process solution upstream of the titanyl sulfate precipitation step (c).

Preferably the ferric ion treatment step lowers the concentration of ferric ions in the process solution to be less than 5 g/L.

More preferably the ferric ion treatment step lowers the concentration of ferric ions in the process solution to be less than 2 g/L.

Preferably the ferric ion treatment step lowers the concentration of ferric ions in the process solution to an extent that the concentration of iron in the titanyl sulfate solution derived from the precipitated titanyl sulfate (e) is less than 5 g/L. In this context, it is noted that the reference to "concentration of iron" is a reference to the concentration of total iron, i.e. iron in the ferric and the ferrous states.

More preferably the concentration of iron in the titanyl sulfate solution derived from the precipitated titanyl sulfate is less than 4 g/L.

More preferably the concentration of iron in the titanyl sulfate solution derived from the precipitated titanyl sulfate is less than 2 g/L.

It is particularly preferred that the concentration of iron in the titanyl sulfate solution derived from the precipitated titanyl sulfate be less than 1 g/L.

The ferric ion treatment step may include treating the process solution with any one or more of $Ti^{3+}$ ions, $SO_2$ gas, $H_2$ gas, Zn dust, Al dust, and iron such as scrap iron and reducing ferric ions to ferrous ions.

Preferably the ferric ion treatment step includes treating the process solution with $SO_2$ gas.

Typically, the ferric iron treatment step with $SO_2$ gas produces acid and the process includes supplying the acid to other unit operations in the process, such as the leach step (a). The increased acid concentration may also be beneficial in the titanyl sulfate precipitation step (c).

The process may include supplying (I) a part of the process solution that has been treated with $SO_2$ gas in the ferric ion treatment step (and therefore has a lower ferric ion concentration) and (II) the process solution as the feed for the ferric ion treatment step. This use of treated process solution makes it possible to maintain the concentration of ferric ions below a limit that has an impact on the solubility of $SO_2$ in the process solution.

Alternatively, the solubility limit issue can be dealt with by operating the ferric ion treatment step with $SO_2$ gas in a succession of stages, with each successive stage reducing a further part of the ferric ions to ferrous ions.

The ferric ion treatment step with $SO_2$ gas may include using a catalyst to improve reaction rates.

The catalyst may be any suitable catalyst.

By way of example, the catalyst may be a carbon catalyst.

The ferric ion treatment step may include the steps of dispersing $SO_2$ into the process solution to load the process solution with a stoichiometric amount of $SO_2$ for reaction with ferric ions and reducing ferric ions to ferrous ions, passing the solution through an activated carbon column, and nitrogen or air sparging the solution to remove any unreacted $SO_2$.

The ferric ion treatment step may include treating the process solution firstly with $SO_2$ gas and thereafter passing the process solution through iron such as scrap iron.

The process may further include a step of precipitating iron sulfate from the process solution from step (b) and/or the depleted process solution from step (d).

The ferric ion treatment step may be carried out prior to or after the iron sulfate precipitation step.

Preferably the ferric ion treatment step is carried out after the iron sulfate precipitation step.

Preferably the process includes supplying the separated process solution from step (d) and/or the separated liquid phase from step (g) to leach step (a).

The process of the present invention includes the following typical reactions.

Leaching:

$$FeTiO_3 + 2H_2SO_4 \rightarrow FeSO_4 + TiOSO_4 + 2H_2O$$

Ferric reduction:

$$Fe_2(SO_4)_3 + SO_2 + 2H_2O \rightarrow 2FeSO_4 + 2H_2SO_4$$

$$Fe_2(SO_4)_3 + Fe^o \rightarrow 3FeSO_4$$

Ferrous sulfate crystallisation:

$$FeSO_4 + 7H_2O + FeSO_4.7H_2O$$

Titanyl sulfate precipitation:

$$TiOSO_4 + 2H_2O \rightarrow TiOSO_4.2H_2O$$

Hydrolysis:

$$TiOSO_4 + 2H_2O \rightarrow TiO(OH)_2 + H_2SO_4$$

Calcination:

$$TiO(OH)_2 \rightarrow TiO_2 + H_2O$$

The applicant has carried out experimental work on a laboratory scale and a pilot plant scale in relation to the above-described process.

The sulfate process of the present invention is now described further by way of example only with reference to the accompanying drawing, of which.

Figure 1:
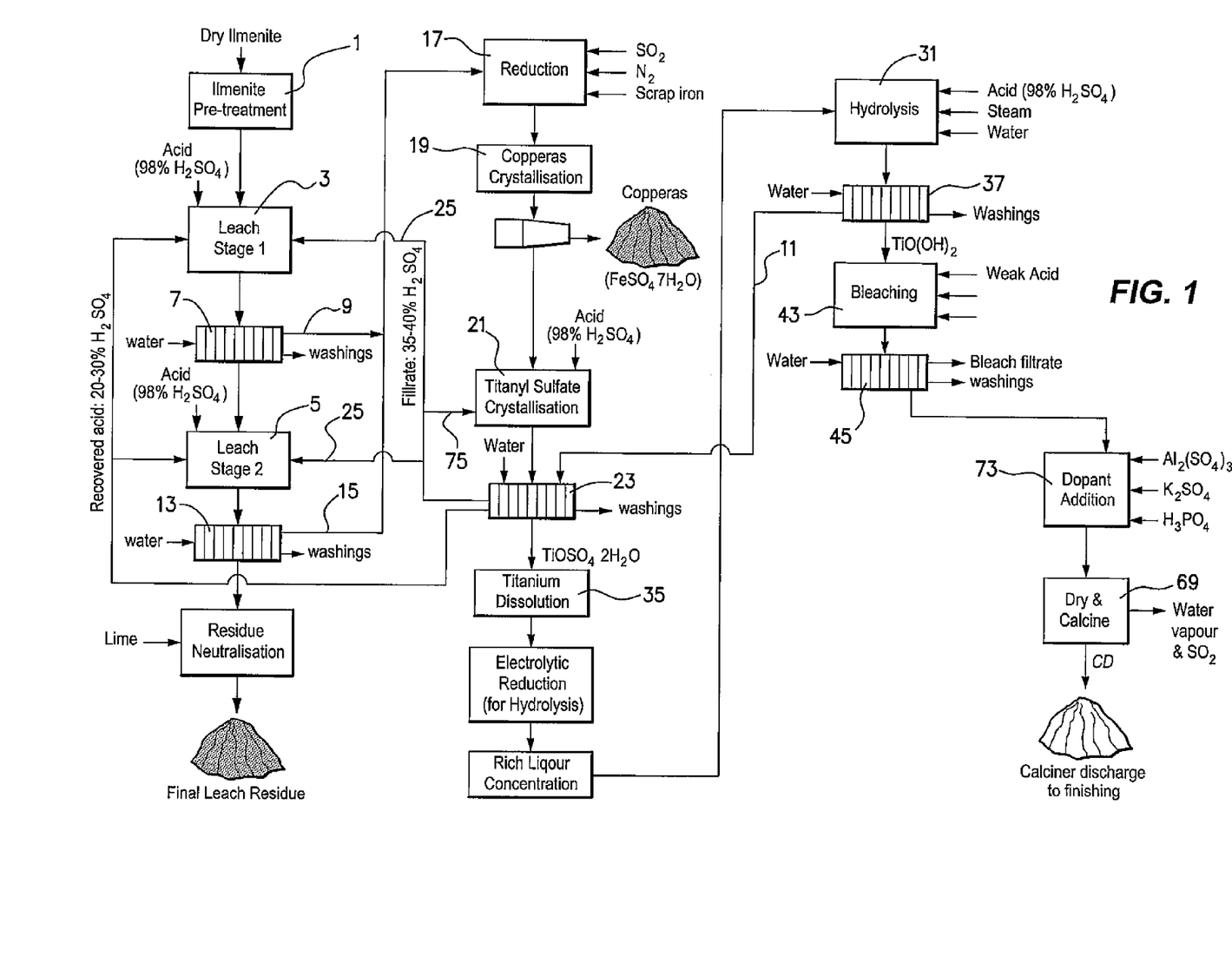
FIG. 1 is a flow sheet of one embodiment of the sulfate process of the present invention.

The flowsheet of FIG. 1 includes the following main steps:
(a) leach;
(b) ferric ion reduction;
(c) ferrous sulfate ("copperas") crystallisation;
(d) titanyl sulfate crystallisation;
(e) titanium dissolution;
(f) hydrolysis for pigment;
(g) bleaching;
(h) calcination; and
(i) finishing.

Each of the above steps (a) to (h) is described hereinafter in turn.

The following description is in the context of producing titania from a titaniferous material in the form of ilmenite in accordance with the sulfate process of the applicant. The present invention is not limited to this titaniferous material. In addition, the present invention is not limited to the sulfate process of the applicant.

With reference to the flowsheet of FIG. 1, dry ilmenite from a storage area is pre-treated in a pre-treatment step 1, such as the ilmenite pre-treatment process described and claimed in International application PCT/AU2005/000387 in the name of the applicant. Alternatively the ilmenite may be pretreated by a conventional process such as grinding. The disclosure in the International application is incorporated herein by cross-reference.

(a) Leach Step

The pre-treated ilmenite is then supplied to the leach step.

The leach step includes two leach stages carried out in separate tanks 3, 5.

Each leach stage is carried out in a single tank 3, 5 as indicated in the flowsheet or in multiple tanks (not shown) arranged in series.

The leach stages may be co-current as shown in the flowsheet or counter-current.

The leach stages may be operated in continuous mode or in batch mode.

The following sources of acid are added to both leach stages: fresh 98% sulfuric acid, filtrate containing 35-40% sulfuric acid from downstream steps in the process, and recovered acid containing 20-30% sulfuric acid from downstream steps in the process.

The leach tanks 3, 5 are simple stirred tanks. Fibre-reinforced plastic (FRP) is suitable for wetted parts. Other suitable materials are acid bricks and tiles.

The leach slurry discharged from the tank 3 is supplied to a filter 7 and washed with water. The filtrate from the filter 7, preferably a pressure filter, forms a process solution and is supplied via a line 9 to a ferric ion reduction step 17 described hereinafter. The filter cake from the filter 7 is supplied to the leach tank 5 and is leached in the tank. The leach slurry discharged from the tank 5 is supplied to a filter 13 and washed with water. The filtrate from the filter 13, preferably a pressure filter, forms a process solution and is supplied via a line 15 to the reduction step 17. The filter cake from the filter 13 is neutralised with lime and is disposed of as a waste product.

The solids loading in the leach step is controlled to give process solutions of about 40 g/L Ti, 90-100 g/L Fe and 400-450 g/L acid in lines 9 and 15. These are the preferred concentrations of Fe and Ti which avoid ferrous sulfate or titanyl sulfate precipitating out prematurely.

Leaching is about 50-60% in the first stage rising to about 80% overall by the end of the second stage. Higher extractions are feasible with further leaching.

Low acidity in the leach stages can cause the premature hydrolysis and precipitation of $TiO(OH)_2$. Typically this becomes significant below about 425 g/L $H_2SO_4$. Above 450 g/L $H_2SO_4$ it is likewise possible to prematurely crystallise out titanyl sulfate dihydrate $TiOSO_4.2H_2O$.

(b) Ferric Ion Reduction Step

The purpose of the ferric ion reduction step 17 is to remove ferric ions from the process solution supplied from the leach step before the titanyl sulfate precipitation step.

The applicant has found that ferric ions precipitate and tend to be carried forward with the titanyl sulfate precipitate intermediate to subsequent steps of the process and has an adverse affect on these process steps and on ultimate product quality. Hence, in view of the co-precipitation of ferric ions and titanyl sulfate, it is desirable to remove ferric ions prior to the titanyl sulfate precipitation step.

Ferric ion reduction is achieved by treating the process solution for the leach step with a suitable reductant, such as any one or more of $Ti^{3+}$ ions, $SO_2$ gas, $H_2$ gas, Zn dust, Al dust, and scrap iron, and converting the ferric ions to ferrous ions.

The applicant has carried out experimental work discussed hereinafter under the heading "Examples" that has established that $SO_2$ gas and scrap iron can reduce ferric ions to ferrous ions in process solutions containing titanyl sulfate produced by leaching ilmenite with sulfuric acid.

Specifically, experimental work established that:

Ferric ions can be reduced to ferrous ions with $SO_2$.

Activated carbon is an effective catalyst to increase the reaction rate.

The activated carbon can be added directly to a process solution, similar to the Carbon in Pulp process used in gold recovery, or can be contained in a column through which the process solution passes if the process solution does not contain a significant amount of solids.

The acid concentration in the process solution increases with $SO_2$ reduction of ferric ions.

The acid produced by the $SO_2$ reduction of ferric ions can be used in leaching of ilmenite.

Ferric ions can be reduced to ferrous ions and $Ti^{4+}$ can be reduced to $Ti^{3+}$ with metallic iron, such as in the form of scrap iron.

The iron in solution increases by about 30 g/l and the acid decreases by 60 g/l, when metallic iron in the form of scrap iron is used.

The experimental work also included experiments to optimise reduction with $SO_2$ and scrap iron by varying the initial chemistry and temperature conditions. For the $SO_2$ system, gas dispersion and adsorption rates and the reaction rates in the activated carbon column were studied. For the scrap iron system, the effects of temperature, acid concentration, and flow rate were studied.

The applicant believes at this stage that a preferred process option for a process solution from the leach step includes using $SO_2$ to reduce the majority of the ferric ions in a process solution to ferrous ions and thereafter, if required, using iron such as in the form of scrap iron to reduce remaining ferric ions and to give about 0 to 1 g/L $Fe^{3+}$ in solution.

More specifically, the preferred process option includes the steps of dispersing $SO_2$ into the process solution to load the process solution with a stoichiometric amount of $SO_2$ for reaction with ferric ions and reducing ferric ions to ferrous ions, passing the solution through an activated carbon column, nitrogen or air sparging the solution to remove any unreacted $SO_2$, and if necessary contacting the solution with scrap iron to reduce any remaining ferric ions.

The solution from the sparger may require cooling to below 50° C. to prevent passivation of the scrap iron in the next stage.

The scrap iron contact step may include lowering and removing bales of de-tinned scrap iron into and from a tank containing the solution to control the amount of $Fe^{3+}$ in solution.

The ferric removal step could be before the copperas precipitation step, which removes the iron, or after the copperas precipitation step where the extra acid is required for the titanyl sulphate precipitation step.

An alternative process option is to include the following steps: dispersing $SO_2$ into the process solution as the solution enters at the base of an activated carbon column, followed by nitrogen or air sparging of the solution to remove any unreacted $SO_2$. In this process option the solution contains 0-1 g/L $Fe^{3+}$ and would not be further treated for ferric reduction.

The applicant has found that it is advantageous to stop reduction such that almost all the ferric ions have been reduced to the ferrous state, without generation of any free trivalent titanium. This minimises the coprecipitation of vanadium with the titanium sulfate intermediate, and undesirable contamination of the resulting titanium solution by vanadium.

(c) Ferrous Sulfate Precipitation Step

Almost all iron in solution eventually leaves the circuit as green crystals of ferrous sulfate, typically ferrous sulfate heptahydrate ($FeSO_4.7H_2O$), in a ferrous sulfate, i.e. copperas, crystallization step 19.

Significant water is also rejected from the process in the ferrous sulfate. This allows recovery and recycling of medium strength acid from the downstream hydrolysis step 31, leading to a much lower overall acid consumption per tonne of $TiO_2$ product.

In the ferrous sulfate precipitation step 19, the process solution from the ferric reduction step 17 is evaporatively cooled to about 20° C. in a tank. This causes ferrous sulfate to precipitate out in the tank. The cooled process solution at this stage contains about 40 g/L Fe and 55 g/L Ti. The titanium ion concentration rises due to the lower volume of the cooled process solution.

Removal of water by evaporation during or after the ferrous sulfate precipitation step 19 may be included to give a further water credit, allowing recovery of more weak acid.

The precipitated ferrous sulfate may be separated from the process solution by a conventional centrifuge or by a belt filter.

The ferrous sulfate may be sold directly or converted to another saleable product.

Although 40 g/L Fe (as ferrous) remain in solution, the iron is recirculated through the process flowsheet and eventually returns to the ferrous sulfate precipitation step 19. The ferrous sulfate crystals therefore are essentially the only point of exit for iron from the circuit.

Mn, Al and Mg are minor elements which exit the circuit primarily with the ferrous sulfate crystals.

(d) Titanyl Sulfate Precipitation Step

In the titanyl sulfate precipitation step, generally identified by the numeral 21, fresh 98% sulfuric acid is added to the process solution from the ferrous sulfate precipitation step 19.

The process conditions cause titanium to precipitate out of the process solution as titanyl sulfate dihydrate, $TiOSO_4.2H_2O$, and to form a slurry in accordance with the following reaction:

$$TiOSO_4+2H_2O \rightarrow TiOSO_4.2H_2O$$

The actual mechanism of precipitation is not clear.

The preferred operating temperature in the titanyl sulfate precipitation step is 110° C.

Precipitation is very slow at less than 90° C.

Precipitation is self seeding in a continuous process—the kinetics of precipitation is accelerated by the presence of the product crystals. For batch operation, seed crystals may be provided, for example by retaining a small portion of slurry from a previous batch.

The precipitated solids are in the form of long needles (typically 1 μm width by 100 μm long). The needle-like morphology causes significant rheology problems in the titanyl sulfate precipitation step that has an impact on handling in the step and in downstream steps in the process. The problem is significant to the extent that even quite low solids loadings can result in thick porridge-like slurries which resist pumping and agitation.

In one particular embodiment the precipitation tank has an upstanding draft tube that has an upper inlet and a lower outlet and the draft tube is located to divide the tank into an outer chamber and a central cylindrical chamber. The assembly also includes an impeller to help circulation of the slurry. The slurry flows through the draft tube and the outer chamber in the tank.

To keep the slurry in a fluid state a recycle of filtrate may be used.

The precipitated solids in the slurry that is discharged from the precipitation tank are separated from the slurry by a filter 23, preferably a pressure filter, into a filter cake and a filtrate. The precipitated solids in the filter cake are washed on the filter 23 by recycled acid from the hydrolysis step as this improves purity of the high strength Ti solution going to hydrolysis.

A carefully controlled water wash is used to displace an optimal amount of remaining acid in the filter cake on the filter 23. Reducing the acid concentration to below 200 g/L destabilises the solids, leading to ultimate dissolution of the solids. Cake squeezing and/or air blowing is then used to control the moisture content of the cake.

The filtrate from the filter 23 contains about 35-50% $H_2SO_4$, 5 g/L Ti and 40 g/L Fe. Some may be recycled if necessary to the titanyl sulfate precipitation stage tank 21 via a line 75. The rest is sent to the leach stages 3, 5 via lines 25.

(e) Titanium Dissolution Step

The water washed filter cake discharged from the filter 23 is added to a stirred tank 35. Over a period of about 2 hours at 50-60° C. the cake dissolves into a high strength Ti titanyl sulfate solution. Lower temperatures can also be used, although the dissolution time may be longer than 2 hours.

The target Ti concentration is at least 200 g/L Ti (as $TiO_2$). The applicant has achieved Ti concentrations considerably exceeding 300 g/L Ti (as $TiO_2$) in laboratory and pilot plant work.

Moreover, in experimental work that included ferric ion control, as described above, the applicant achieved concentrations of less than 5 g/L Fe in the filter cake.

The dissolution process preferably requires less than 100 g/L acid in the solution contained within the filter cake to ensure that the process goes to completion. If most or all acid is washed out the free acid content of the high strength solution can be quite low.

The high strength solution produced in the stirred tank 35 is filtered through a filter cartridge (not shown) to remove siliceous and other fine particulate matter.

Unlike normal metal sulfates, the $TiOSO_4 \cdot 2H_2O$ in the filter cake does not immediately dissolve in water. Also, its solubility in greater than 20% $H_2SO_4$ is quite low. This suggests the dissolution process is not strictly dissolution. The remarkable solubility of Ti at low acidity (>200 g/L Ti) compared to 20% $H_2SO_4$ (~5 g/L Ti) favours this view.

(f) Hydrolysis Step

The high strength Ti titanyl sulfate process solution produced in the stirred tank 35 is suitable for all conventional pigment hydrolysis processes.

It also may be used for continuous or batch precipitation of coarse high purity $TiO(OH)_2$.

The pigment hydrolysis processes are typically batch processes due to critical need to control particle size.

The process solution is pre-treated prior to the hydrolysis step 31 to generate about 2 g/L of $Ti^{3+}$ in the solution by conventional means. The $Ti^{3+}$ protects against oxidation of any iron to $Fe^{3+}$, which otherwise co-precipitates with the Ti and imparts undesirable colour to the pigment.

The process solution is adjusted with acid to an A/T ratio suitable for pigment hydrolysis, using either concentrated $H_2SO_4$ or preferably hydrolysis filtrate.

The A/T ratio is a key process parameter. The A/T ratio is defined as:

$$[\text{Free acid} + \text{bound acid in TiOSO}_4] \div [\text{TiO}_2]$$

All parameters are expressed in g/L.

In practice the [Free acid+bound acid in $TiOSO_4$] concentration is measured by a simple titration to pH 7 with sodium hydroxide solution, and the [$TiO_2$] g/L is Ti g/L÷0.6.

Typically, the pigment industry prefers to operate hydrolysis with an A/T ratio in the range of 1.5:1 to 2.5:1, more preferably a ratio of 1.75:1, in order to produce a required particle size range for the pigment industry.

The hydrolysis step 31 is carried out by preheating a heel of water, typically 10-30% of the volume of feed solution, to about 96° C.

The process solution is also preheated to about 96° C. and then is pumped across to the batch hydrolysis tank over a fixed time period.

The hydrolysis tank is equipped with steam heating and a gate type rake stirrer, which operates at low rpm. Preferably the steam heating is indirect so that the filtrate is not diluted by condensate.

The initial few seconds of pumping cause the precipitation of very fine $TiO(OH)_2$ particles, which cause a milky aspect for about 30 seconds, then appear to redissolve. In practice the fine particles are colloidal nuclei which control the size of both the resulting precipitate and the crystal size in the calciner discharge. Control of this step is therefore key to preparing good pigment.

After all process solution is pumped across or dropped in from a header tank, the slurry temperature is carefully heated to the boiling point (typically at 1° C./minute).

The slurry is then boiled for about 5 hours, by which time the Ti remaining in solution has been lowered to about 5 g/L.

The slurry in the hydrolysis tank is then filtered on a filter 37, preferably a pressure filter, to produce a $TiO(OH)_2$ filter cake and a filtrate.

There are no special requirements for filtration as the particle size has already been established. A range of filters are used across the industry. The particles naturally flocculate together and the filtration rate is fast enough that vacuum filtration may be used. The filter cake contains about 55% w/w of water.

The filtrate from the filter 37 contains 350-450 g/L $H_2SO_4$. This is returned via a line 11 to the filter 23 downstream of the titanyl sulfate precipitation tank 21.

(g) Bleaching Step

The $TiO(OH)_2$ filter cake that is discharged from the filter 37 is re-pulped with acid in a bleaching step 43.

Trivalent titanium is added to reductively leach out chromophores such as Fe, Cr, Mn and V, which otherwise would reduce the whiteness of the final pigment.

The bleaching step 43 typically takes place at 70-80° C. Rutile seed slurry is added at this point.

The bleached slurry is filtered and washed in a filter 45, preferably a pressure filter.

(h) Calcination Step

The $TiO(OH)_2$ filter cake from the bleaching step 43 is mixed with a number of additives in a dopant addition step 73 and is then dried and calcined in a calciner 69.

The additives may be added as aqueous solutions or as solids. The additives may include 0.2% $K_2O$ as $K_2SO_4$, 0.6% ZnO as $ZnSO_4$ and 0.3% $P_2O_5$ as $H_3PO_4$.

The additives control development of the rutile crystals during calcination, such that the crystal size is 0.27±0.03 µm, rutilisation is 98.5±0.5%, the crystals have a lenticular shape and are not sintered together.

The product produced in the calciner 69 is then transported to downstream customers.

EXAMPLES

Ferric Ion Reduction Step (b)

As indicated above in section (b) entitled "Ferric Ion Reduction Step", the applicant has carried out experimental work on ferric ion reduction of process solutions. The following Examples 1 and 2 discuss a part of the experimental work.

Example 1

$SO_2$ Gas Treatment of Ferric Ions

This experimental program focussed on the use of $SO_2$ gas to reduce ferric ions.

$SO_2$ gas was introduced into 4 L of a process solution in a 5 L baffled culture reactor stirred by a Chemineer CD6 titanium impeller at 500 rpm.

The process solution contained: 50-80 g/L $TiO_2$; less than 15 g/L ferric ions; 30-80 g/L ferrous ions; and 350-500 g/L free acid. A bottle of $SO_2$ gas was positioned on a balance and a flowmeter was used to control gas delivery.

The $SO_2$ gas was added to the process solution via a glass sparger tube positioned just below the impeller. A one way valve was fitted to prevent the backflow of solution into the bottle. The $SO_2$ gas was introduced at the start of the experiment and then turned off once the solution was pumped to a carbon column. The temperature was controlled to be 60° C. by an infra red hotplate and a type K thermocouple.

The $SO_2$ rich process solution was pumped from the reactor mentioned above to the base of a carbon column with a Watson Marlow 520U Peristaltic pump and was allowed to flow back to the reactor from a tube at the top of the column. The flow to the column was kept constant at 100 mL/min and all experiments were carried out at 60° C. The column was constructed from an acid-resistant plastic with Teflon ends in which rubber o-rings had been incorporated. The column had a height of 450 mm and an internal diameter of 46 mm.

Aquacarb 207C was the activated carbon used for all experiments.

The concentration of $SO_2$ was measured by a Fe(II) ion titration on sparged and unsparged samples. $SO_2$ gas concentration (g/L) was determined by the difference in titrant volume over aliquot volume.

Samples were taken from both the reactor and directly from the column discharge tube every hour.

Figure 2:
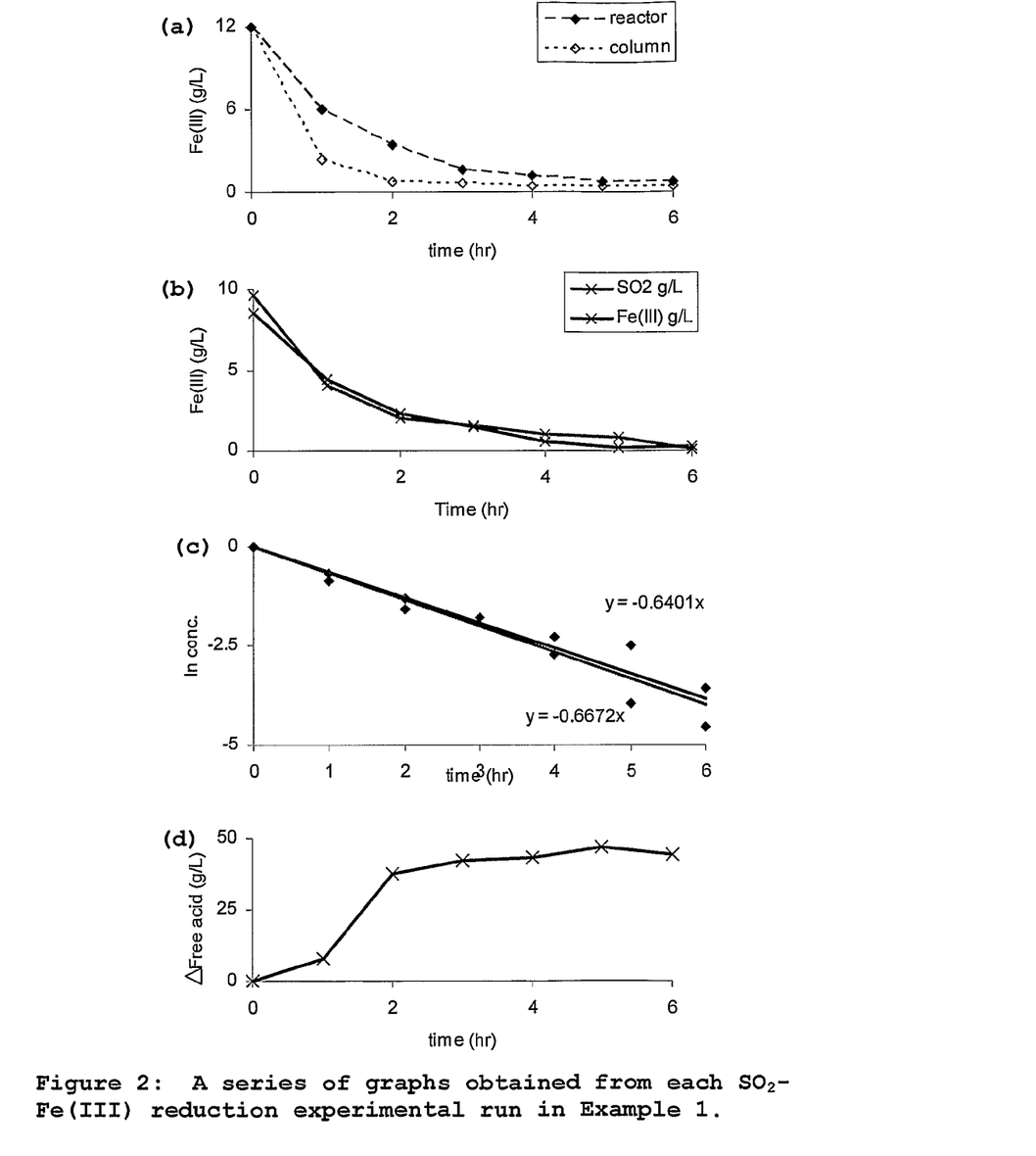
FIG. 2 is a series of graphs obtained in an experimental programme discussed in Example 1 that investigated ferric ion reduction using $SO_2$ gas.

The results of the experimental programme are summarised in the graphs of FIG. 2. FIG. 2(a) shows the change in $Fe^{3+}$ concentration with time in the reactor and directly after passage through the carbon column, FIG. 2(b) shows the decay in concentration of both reagents—$SO_2$ and $Fe^{3+}$ in the solution leaving the column from which preliminary kinetic analysis can be performed, FIGS. 2(c) and 2(d) show the change in free acidity upon oxidation of $SO_2$.

FIG. 2(a) shows that there was a decrease in $Fe^{3+}$ from both the reactor and the column and shows a significantly reduced $Fe^{3+}$ concentration leaving the column.

FIG. 2(b) shows that there was a decrease in both $Fe^{3+}$ and $SO_2$ concentrations in the column discharge stream. Both decayed exponentially at nearly the same rate and showed a linear dependence when the natural log is plotted against time (FIG. 2(c)). This indicates that the rate of consumption of each reagent is similar and that neither $SO_2$ nor $Fe^{3+}$ is constraining the kinetics of reaction under the conditions examined.

FIG. 2(d) shows that there was a corresponding increase in acidity upon oxidation of $SO_2$.

$Fe^{3+}$ and $SO_2$ can react in solution without the presence of a carbon catalyst but this occurs at a rate approximately three orders of magnitude more slowly than in the presence of carbon catalyst. The carbon catalyst provides a surface on which $SO_2$ and $Fe^{3+}$ can adsorb and promotes the transfer of electrons between species. The surface area of the catalyst therefore has an important affect on the reaction rate.

Figure 3:
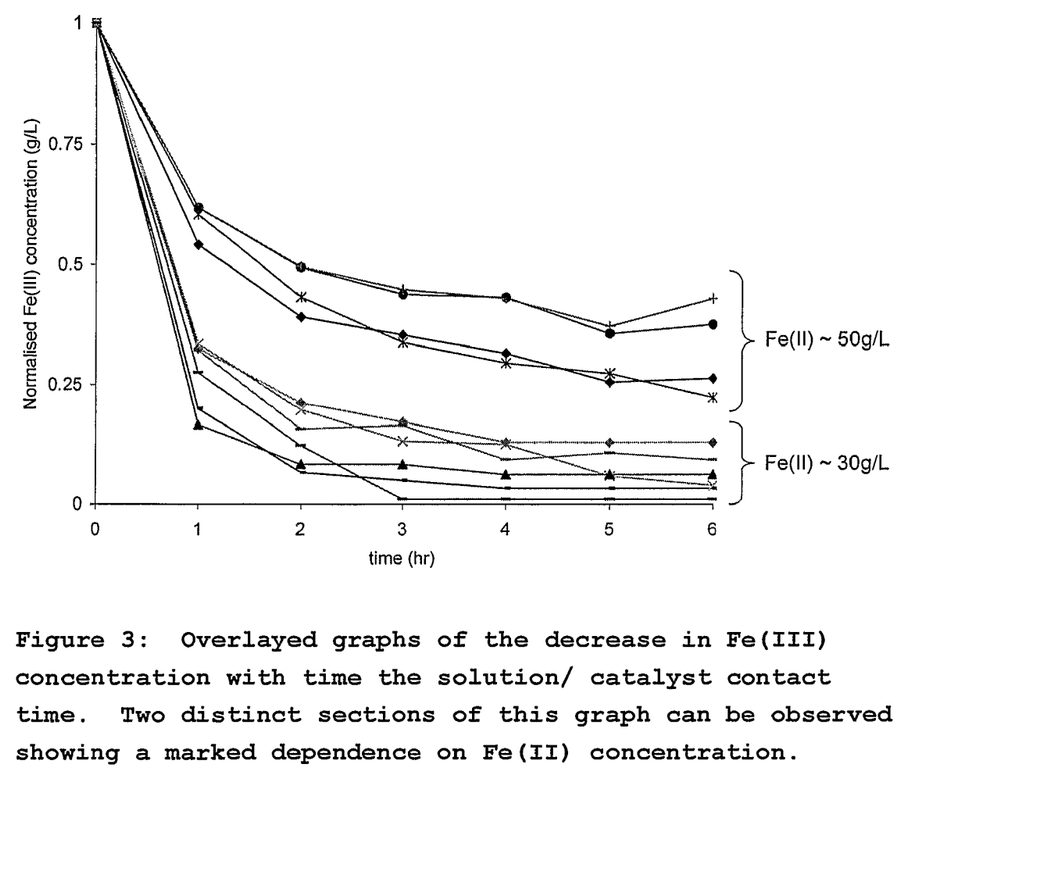
FIG. 3 is a series of $Fe^{3+}$ reduction curves collected during the experimental programme of Example 1.

Overlaid in FIG. 3 is a series of $Fe^{3+}$ reduction curves collected during the experimental programme. It is immediately apparent from this graph how important $Fe^{3+}$ concentration is on using $SO_2$ to treat $Fe^{3+}$. The graph shows two distinct sections showing a marked dependence on $Fe^{2+}$ concentration. When $Fe^{2+}$ concentrations are high, i.e. around 50 g/L, the residual $Fe^{3+}$ concentration does not fall below ~7 g/L; in contrast to the nearly total conversion of $Fe^{3+}$ when $Fe^{2+}$ concentrations are low, i.e. around 30 g/L.

In order to determine the life of the carbon catalyst, fresh process solutions were dosed with $SO_2$ and then pumped through the column for 6 hrs. The change in $Fe^{3+}$ concentration was measured by direct titration and the degree of deterioration of the catalytic effect of the carbon was determined by the decrease in $Fe^{3+}$ reduction over that time period.

These tests were run for a cumulative time of 936 hrs (39 days) with no water washing between experiments. No loss in catalytic ability was observed during this time.

However, the column became physically blocked resulting in an unsustainable back pressure on the pump. A sample of the carbon was removed and analysed using microscopy to identify the solid precipitating around the granules and to identify whether there were any noticeable changes in the carbon surface. The precipitate was $TiOSO_4 2H_2O$ and no difference in the surface of unused and used carbon was observed by microscopy.

The column was easily regenerated by pumping through 6 L of warm water (60° C.). This dissolved all of the $TiOSO_4 2H_2O$ precipitate and the column continued to operate as at the beginning of the tests.

In anticipation of scaling this process to a pilot plant and commercial scale, a number of different design options have been examined. These involve:

Pre-dosing $SO_2$ into the process solution and then pumping through the carbon column in a single pass.

Co-current addition of $SO_2$ and the process solution directly into the base of the column.

Counter-current addition of $SO_2$ and process solution directly into the base of the column.

Sparging the $SO_2$ into the process solution containing a suspension of activated carbon.

The applicant has determined that all these options are feasible.

Example 2

Scrap Iron Treatment of Ferric Ions

This experimental program focussed on the use of metallic iron in the form of scrap iron to reduce ferric ions.

As was the case with the experimental programme in Example 1, the process solution contained: 50-80 g/L $TiO2$; less than 15 g/L ferric ions; 30-80 g/L ferrous ions; and 350-500 g/L free acid.

De-tinned scrap was chosen as the preferred metallic iron source because it is clean and has a high surface area for reaction. Other types of iron scrap that were assessed were shredded scrap, which may have significant amounts of zinc and copper, and transformer punchings which were high in silicon and were coated with a clear finish to prevent corrosion.

Figure 4:
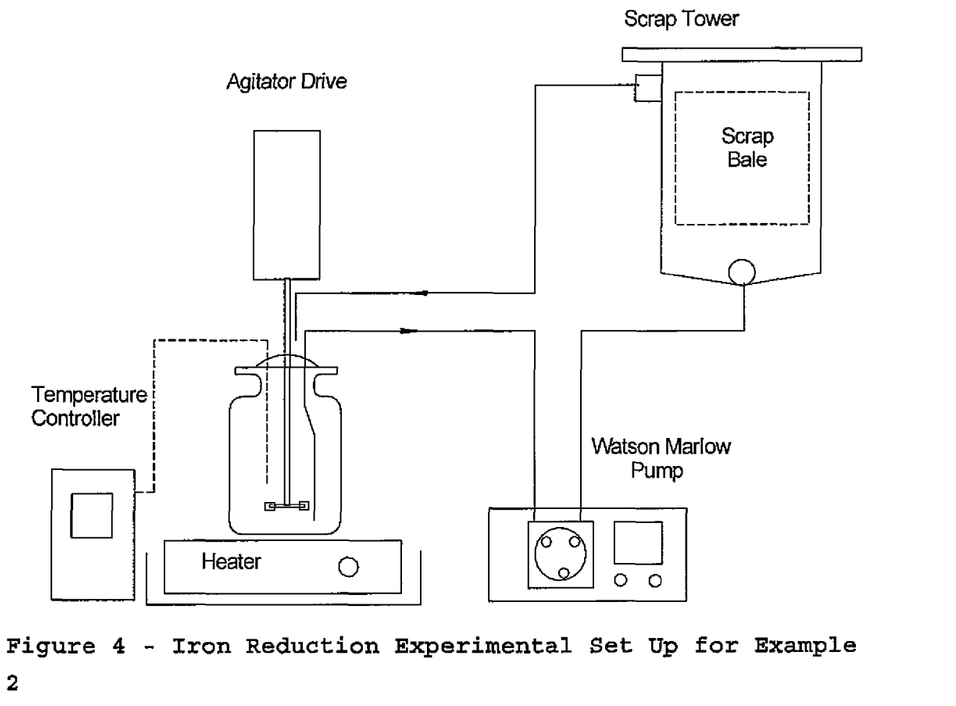
FIG. 4 is a drawing of the experimental set up used in the experiment programme described in Example 2.

The equipment used in Example 1 was used in this example. FIG. 4 is a drawing of the experimental set up.

Specifically, the equipment comprised the above-mentioned a reactor, agitator and heater. The Watson Marlow pump was connected from the reactor to a glass fibre reinforced tank. The tank was constructed to hold a 150 mm cube of compacted de-tinned scrap.

The scrap was packed in rubber around the vertical sides with rubber sheet to force the solution to flow through the scrap. The solution then overflowed back to the reactor. Oxidation/reduction potential measurements were made on cooled solutions and were a reliable measurement for indicating how far the reduction had progressed.

The initial trials carried out at the proof of concept stage showed that metallic iron could reduce both ferric iron and $Ti^{4+}$.

Effect of Acid Concentration

Three different acid concentrations 440, 470 and 500 g/L were tested to evaluate the effect of acid concentration.

It was found that over this range of acid concentration there was an effect on reaction rate. The rate was measured between ferric ion concentrations of 12 g/l and 2 g/L. Over the acid range tested, decreasing acid resulted in more iron going into solution to achieve a comparable ferric level. At 400 g/l acid the iron increase was 44 g/l and this systematically decreased over the higher acid runs to 14 g/L at 500 g/L acid. The highest acid concentration resulted in the highest total iron concentration of 147 g/l.

Figure 5:
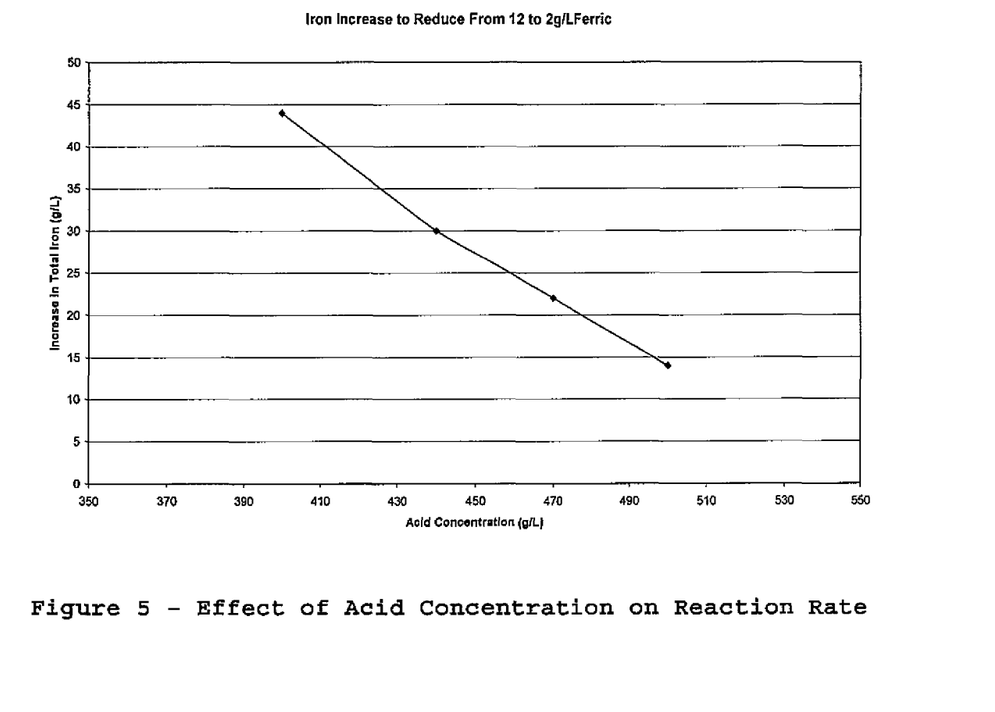
FIG. 5 is a plot of increase in total iron versus acid concentration obtained in the experimental programme discussed in Example 2.

The results are presented in the graph of FIG. 5.

The flow rate through the cell was varied between 100 and 500 ml/min to evaluate the effect of this parameter. The experiment was set up as a single pass test.

Effect of Temperature

A test was carried out at 75° C. that resulted in an increase in the reaction rate compared to the reaction rate at lower temperatures.

The time taken to remove all the ferric ions was about 25 minutes at 60° C. and 10 minutes at 75° C. The total iron however had increased by 50 g/L while that of the previous test at 60° C. and the same acid was 14 g/L.

Effect of Titanium Concentration.

Three titanium concentrations were tested, namely 32, 35 and 37 g/L with copperas barren liquor at 60° C., 450 g/L acid and a flow rate of 100 mL/min. In all three cases the time to lower the concentration of the ferric ions from 12 g/L to 2 g/L was about 18 minutes.

Passivation.

During some runs there was evidence of the iron becoming passivated. During the runs there was some hydrogen evolved from the reaction of acid and iron. During some runs the gas evolution slowed and the ORP reading would begin to increase. This occurred with runs over 60° C. and runs with high acid. If the block was washed with water the treatment would restore the reactivity of the iron.

In the iron reduction runs once the ferric ions were all reduced to ferrous ions, titanium in solution was reduced from $Ti^{4+}$ to $Ti^{3+}$. There is a large difference in the potentials of these two reactions so that when reducing with iron once the oxidation/reduction potential goes from 300 mV to below zero all of the ferric has been converted.

Figure 6:
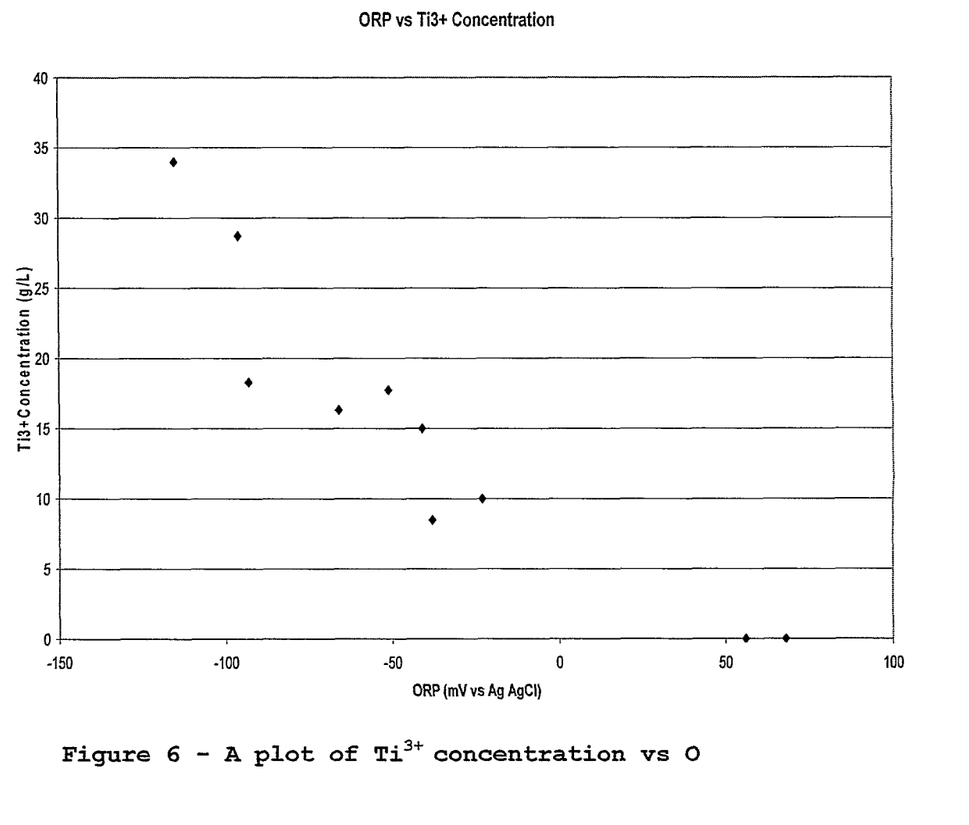
FIG. 6 is a plot of $Ti^{3+}$ concentration versus oxidation/reduction potential obtained in the experimental programme discussed in Example 2.

A plot of $Ti^{3+}$ concentration versus oxidation/reduction potential is shown in FIG. 6.

Many modifications may be made to the process flowsheet described above without departing from the spirit and scope of the present invention.

By way of example, whilst the description of the present invention in relation to the flowsheet of FIG. 1 which is an example of the sulfate process of the applicant, the present invention is not so limited and extends to the conventional sulfate process.

The invention claimed is:

1. A sulfate process for producing titania from a titaniferous material that includes at least one of a digestion step and a leach step that form a process solution that includes an acidic solution of titanyl sulfate ($TiOSO_4$) and iron sulfate ($FeSO_4$) from the titaniferous material and a hydrolysis step that forms titania from the titanyl sulfate in the process solution, comprising treating the process solution with a ferric ion treatment step that includes $SO_2$ gas and a catalyst to lower the concentration of ferric ions in the process solution and to produce acid that is supplied to other unit operations in the process.

2. The process defined in claim 1 that includes the steps of:
    (a) leaching solid titaniferous material with a leach solution containing sulfuric acid and forming the process solution that includes the acidic solution of titanyl sulfate ($TiOSO_4$) and iron sulfate ($FeSO_4$);
    (b) separating the process solution and a residual solid phase from the leach step (a);
    (c) precipitating titanyl sulfate from the process solution from step (b);
    (d) separating the precipitated titanyl sulfate from the process solution;
    (e) treating the precipitated titanyl sulfate and producing a solution containing titanyl sulfate;
    (f) hydrolysing the titanyl sulfate in the solution and forming a solid phase containing hydrated titanium oxides and a liquid phase;
    (g) separating the solid phase containing hydrated titanium oxides and the liquid phase; and
    (h) calcining the solid phase from step (g) and forming titania, wherein the ferric ion treatment step lowers the concentration of ferric ions from the process solution upstream of the titanyl sulfate precipitation step (c).

3. The process defined in claim 1 wherein the ferric ion treatment step lowers the concentration of ferric ions in the process solution to less than 5 g/L.

4. The process defined in claim 1 wherein the ferric ion treatment step lowers the concentration of ferric ions in the process solution to less than 2 g/L.

5. The process defined in claim 2 wherein the ferric ion treatment step lowers the concentration of ferric ions in the process solution to an extent that the concentration of iron in the titanyl sulfate solution derived from the precipitated titanyl sulfate (e) is less than 5 g/L.

6. The process defined in claim 2 wherein the concentration of iron in the titanyl sulfate solution derived from the precipitated titanyl sulfate (e) is less than 4 g/L.

7. The process defined in claim 2 wherein the concentration of iron in the titanyl sulfate solution derived from the precipitated titanyl sulfate (e) is less than 2 g/L.

8. The process defined in claim 2 wherein the ferric ion treatment step includes treating the process solution with at least one of $Ti^{3+}$ ions, $SO_2$ gas, $H_2$ gas, Zn dust, Al dust, scrap iron, and iron and reducing ferric ions to ferrous ions.

9. The process defined in claim 1 wherein the ferric ion treatment step includes treating the process solution with $SO_2$ gas.

10. The process defined in claim 1 includes supplying (i) a part of the process solution that has been treated with $SO_2$ gas in the ferric ion treatment step and (ii) the process solution as the feed for the ferric ion treatment step.

11. The process defined in claim 1 wherein the ferric ion treatment step includes the steps of dispersing $SO_2$ into the process solution to load the process solution with a stoichiometric amount of $SO_2$ for reacting with ferric ions and reducing ferric ions to ferrous ions, passing the solution through an activated carbon column, and sparging the solution with air or nitrogen to remove any unreacted $SO_2$.

12. The process defined in claim 1 wherein the ferric ion treatment step includes treating the process solution firstly with $SO_2$ gas and thereafter passing the process solution through iron.

13. The process defined in claim 1 further includes precipitating iron sulfate from the process solution.

* * * * *